US011768277B2

(12) United States Patent
Tang et al.

(10) Patent No.: US 11,768,277 B2
(45) Date of Patent: Sep. 26, 2023

(54) TIME-OF-FLIGHT SENSOR AND CONTROL METHOD THEREOF

(71) Applicant: PixArt Imaging Incorporation, HsinChu (TW)

(72) Inventors: Kuan Tang, HsinChu (TW); Kai-Chieh Chuang, HsinChu (TW); Chia-Chi Kuo, HsinChu (TW); Jui-Te Chiu, HsinChu (TW)

(73) Assignee: PIXART IMAGING INCORPORATION, Hsinchu (TW)

( * ) Notice: Subject to any disclaimer, the term of this patent is extended or adjusted under 35 U.S.C. 154(b) by 885 days.

(21) Appl. No.: 16/674,007

(22) Filed: Nov. 5, 2019

(65) Prior Publication Data

US 2021/0132198 A1 May 6, 2021

(51) Int. Cl.
*G01S 7/4861* (2020.01)
*G01S 17/10* (2020.01)
*G01S 17/89* (2020.01)

(52) U.S. Cl.
CPC ............ *G01S 7/4861* (2013.01); *G01S 17/10* (2013.01); *G01S 17/89* (2013.01)

(58) Field of Classification Search
CPC ................................ G01S 7/4861; G01S 17/89
See application file for complete search history.

(56) References Cited

U.S. PATENT DOCUMENTS

| 11,592,536 | B2* | 2/2023 | Hitomi | G01S 17/89 |
| 2013/0119438 | A1* | 5/2013 | Kim | H04N 13/207 |
| | | | | 257/E27.15 |
| 2015/0130904 | A1* | 5/2015 | Bae | G01S 7/4915 |
| | | | | 348/46 |
| 2016/0181298 | A1* | 6/2016 | Wan | H01L 27/14627 |
| | | | | 257/292 |
| 2016/0344965 | A1* | 11/2016 | Grauer | H01L 27/14656 |
| 2017/0097417 | A1* | 4/2017 | Wang | G06F 1/04 |
| 2019/0075281 | A1* | 3/2019 | Hall | G02B 26/10 |
| 2019/0208150 | A1* | 7/2019 | Jin | G01S 17/89 |
| 2020/0018834 | A1* | 1/2020 | Boutaud | G01S 7/4808 |
| 2020/0256991 | A1* | 8/2020 | Kim | H01L 27/14643 |
| 2020/0279881 | A1* | 9/2020 | Jin | H01L 27/14603 |
| 2021/0368123 | A1* | 11/2021 | Watanabe | H04N 5/37452 |

* cited by examiner

*Primary Examiner* — Jeremiah C Hallenbeck-Huber
(74) *Attorney, Agent, or Firm* — Tung & Associates (57) ABSTRACT

A time-of-flight sensor for capturing a three-dimensional (3D) image of an object, includes: a light source for emitting projection light pulses at the object according to a projection signal; an array of pixel circuits for sensing reflection light pulses and storing image charges according to the reflection light pulses; and a processing circuit for calculating a first sum of first portions of the image charges and a second sum of second portions of the image charges to generate a distance information signal of the 3D image of the object simultaneously, wherein in one accumulation period, the first portion of the image charges is generated during a first time period, and the second portion of the image charges is generated during a second time period, wherein the second time period is directly following the first time period in the accumulation period.

15 Claims, 7 Drawing Sheets

TIME-OF-FLIGHT SENSOR AND CONTROL METHOD THEREOF

BACKGROUND OF THE INVENTION

Field of Invention

The present invention relates to a time-of-flight sensor; particularly, it relates to such time-of-flight sensor which is capable of three-dimensional (3D) imaging. The present invention also relates to a transfer method of the time-of-flight sensor.

Description of Related Art

An image sensor which is capable of capturing a three-dimensional (3D) image of an object is required to include plural camera units to capture plural images. By the plural images, the 3D image can be created by triangulation technique. One drawback of such prior art using the triangulation technique is the device size limitation; to create 3D images, there must be a minimum separation distance between each camera unit, so the device size is large. In addition, the triangulation technique is complex and therefore requires significant computer processing power in order to create the 3D image in real time.

In view of above, to overcome the drawback in the prior art, the present invention provides a time-of-flight sensor which can use a relatively smaller device to create a 3D image of an object, and a transfer method thereof.

SUMMARY OF THE INVENTION

From one perspective, the present invention provides a time-of-flight sensor, configured to operably capture a three-dimensional (3D) image of an object, the time-of-flight sensor comprising: a light source, which is configured to operably emit projection light pulses at the object according to a projection signal; an array of a plurality of pixel circuits, wherein each of the pixel circuits is configured to operably accumulate image charges in response to reflection light pulses which are light pulses of the projection light pulses reflected from the object, and store a first sum of a plurality of first portions of the image charges and a second sum of a plurality of second portions of the image charges according to the projection signal over a plurality of accumulation periods; and a processing circuit, which is coupled to the array of the pixel circuits, and includes: a first readout circuit, which is configured to operably calculate the first sum of the first portions of the image charges; and a second readout circuit, which is configured to operably calculate the second sum of the second portions of the image charges; wherein the first readout circuit and the second readout circuit simultaneously calculate the first sum of the first portions of the image charges and the second sum of the second portions of the image charges to generate a distance information signal of the 3D image of the object; wherein in each of the accumulation periods, the first portion of the image charges are accumulated in the pixel circuit during a first time period, and the second portion of the image charges are accumulated in the pixel circuit during a second time period, wherein the first time period and the second time period are both within said each accumulation period and the second time period is directly following the first time period.

In one preferable embodiment, the pixel circuit includes: a photodiode, which is configured to operably accumulate the image charges in the accumulation periods in response to the reflection light pulse; a first storage unit, which is configured to operably store the first sum of the first portions of the image charges, wherein the first sum of the first portions of the image charges is a sum of the first portions of the image charges over the accumulation periods; a first transfer switch, which is coupled between the photodiode and the first storage unit, and is configured to operably transfer the first portions of the image charges from the photodiode to the first storage unit over the accumulation periods; a first output transistor, which is coupled to the first storage unit, and is configured to operably transfer the first sum of the first portions of the image charges from the first storage unit to the first readout circuit; a second storage unit, which is configured to operably store the second sum of the second portions of the image charges, wherein the second sum of the second portions of the image charges is a sum of the second portions of the image charges over the accumulation periods; a second transfer switch, which is coupled between the photodiode and the second storage unit, and is configured to operably transfer the second portions of the image charges from the photodiode to the second storage unit over the accumulation periods; and a second output transistor, which is coupled to the second storage unit, and is configured to operably transfer the second sum of the second portions of the image charges to the second readout circuit.

In one preferable embodiment, the pixel circuit further includes: a first reset transistor, which is coupled to a first readout node between the first output transistor and the first readout circuit, and is configured to operably reset charges accumulated at the first readout node; and a second reset transistor, which is coupled to a second readout node between the second output transistor and the second readout circuit, and is configured to operably reset charges accumulated at the second readout node.

In one preferable embodiment, the first transfer switch includes two first transfer transistors connected in series; and wherein the second transfer switch includes two second transfer transistors connected in series.

In one preferable embodiment, the first storage unit includes a first storage transistor; and wherein the second storage unit includes a second storage transistor.

In one preferable embodiment, the first time period and the second time period are both 50% of said each accumulation period and the second time period is directly following the first time period.

In one preferable embodiment, the pixel circuit further includes a photodiode reset transistor, which is coupled to the photodiode, and is configured to operably reset charges accumulated in the photodiode after the plurality of accumulation periods.

In one preferable embodiment, a first transfer control signal which controls the first transfer switch is in-phase with the projection signal.

In one preferable embodiment, the first readout circuit includes: a first source follower, which is coupled to the first readout node, and is configured to convert the first sum of the first portions of the image charges to a first readout signal; a first row selection transistor, which is coupled to the first source follower, and is configured to operably transfer the first readout signal to a first counter; and the first counter, which is coupled to the first row selection transistor, and is configured to operably calculate the first readout signal; and the second readout circuit includes: a second source follower, which is coupled to the second readout node, and is configured to convert the second sum of the second portions of the image charges to a second readout signal; a second row selection transistor, which is coupled to the second source follower, and is configured to operably transfer the second readout signal to a second counter; and the second counter, which is coupled to the second row selection transistor, and is configured to operably calculate the second readout signal.

In one preferable embodiment, the first reset transistor receives a first two-state signal which has a first reset state and a first disable state, for resetting charges accumulated at the first readout node and disable the first readout circuit respectively; and wherein the second reset transistor receives a second two-state signal which has a second reset state and a second disable state, for resetting charges accumulated at the second readout node and disable the second readout circuit respectively.

From another perspective, the present invention provides a control method of a time-of-flight sensor for capturing a three-dimensional (3D) image of an object, the control method comprising: emitting projection light pulses at the object according to a projection signal; accumulating image charges in response to reflection light pulses which are light pulses of the projection light pulses reflected from the object; storing a first sum of a plurality of first portions of the image charges and a second sum of a plurality of second portions of the image charges according to projection signal over a plurality of accumulation periods; and calculating the first sum of the first portions of the image charges and the second sum of the second portions of the image charges simultaneously; generating a distance information signal of the 3D image of the object according to the first sum of the first portions of the image charges and the second sum of the second portions of the image charges; wherein in each of the accumulation periods, the first portion of the image charges are accumulated during a first time period, and the second portion of the image charges are accumulated during a second time period, wherein the first time period and the second time period are both in said each accumulation period and the second time period is directly following the first time period.

In one preferable embodiment, the control method further comprises transferring the first portions of the image charges from a photodiode to a first storage unit over the accumulation periods according to the projection signal; transferring the first sum of the first portions of the image charges from the first storage unit to a first readout circuit which is configured to operably calculate the first sum of the first portions of the image charges; transferring the second portions of the image charges from the photodiode to a second storage unit over the accumulation periods according to the projection signal; and transferring the second sum of the second portions of the image charges from the second storage unit to a second readout circuit which is configured to operably calculate the second sum of the second portions of the image charges.

In one preferable embodiment, the control method further comprises: resetting charges accumulated at a first readout node and a second readout node, wherein the first readout node is between the first storage unit and the first readout circuit, and the second readout node is between the second storage unit and the second readout circuit.

In one preferable embodiment, the first time period and the second time period are both 50% of the accumulation period and the second time period is directly following the first time period.

In one preferable embodiment, the control method further includes resetting charges accumulated in the photodiode after the plurality of accumulation periods.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signals, but not drawn according to actual scale.

Figure 1A:
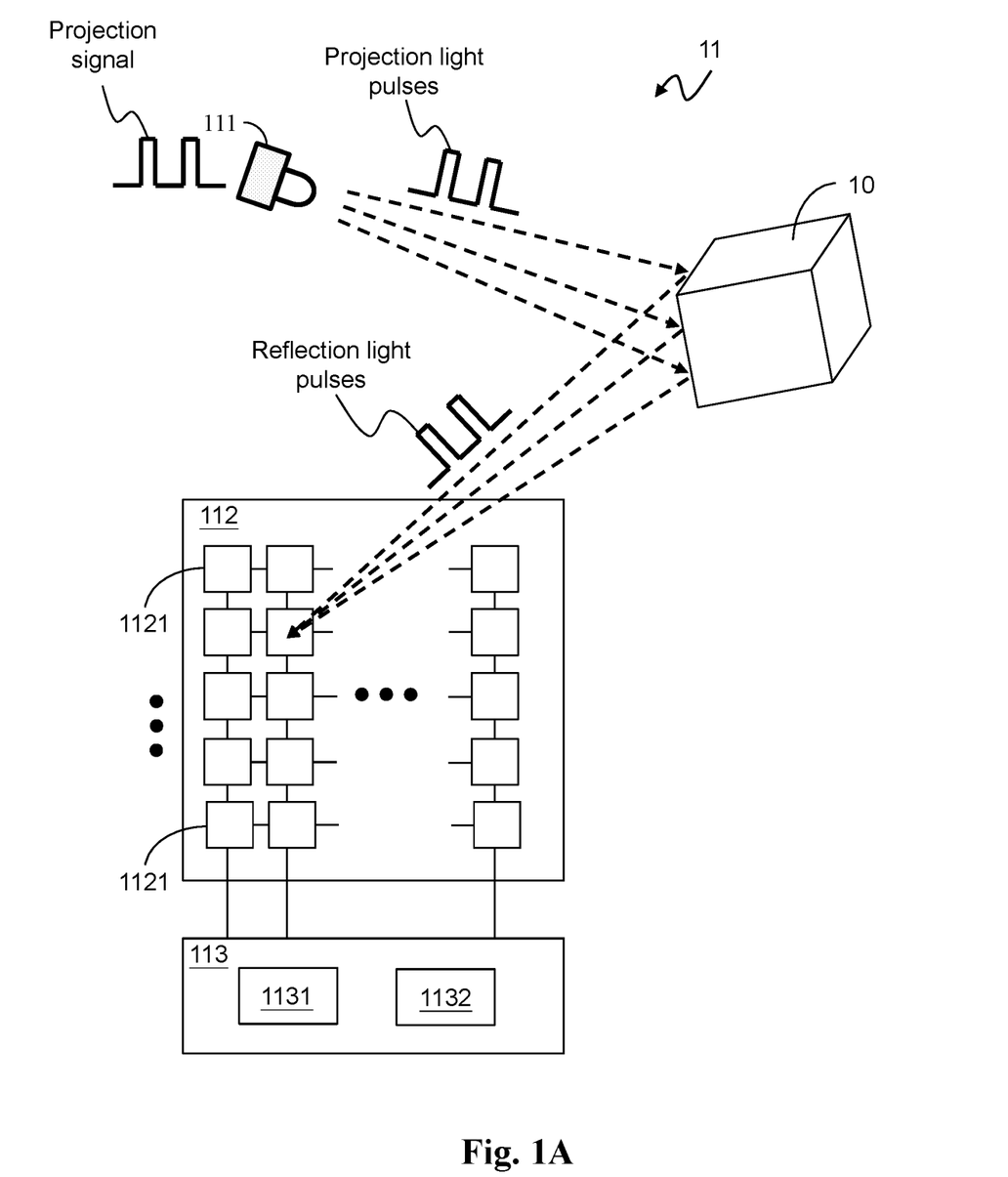
FIG. 1A is a schematic diagram of a first embodiment showing a time-of-flight sensor according to the present invention.
Figure 1B:
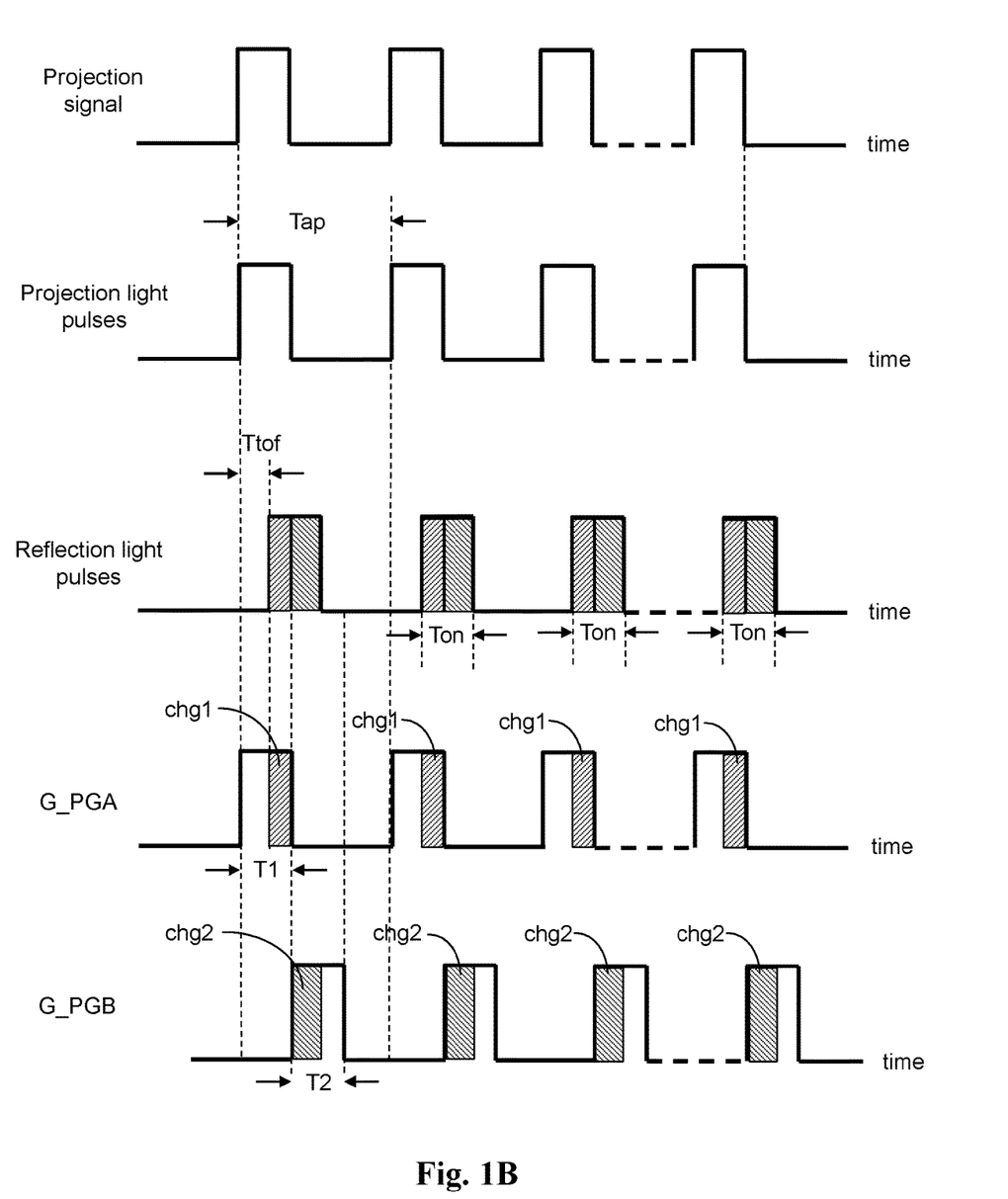
FIG. 1B is a schematic diagram showing a time chart of the first embodiment according to the present invention.

FIGS. 1A and 1B show schematic diagrams of a first embodiment according to the present invention. As shown in FIG. 1A, a time-of-flight sensor 11 is configured to operably capture a three-dimensional (3D) image of an object 10. The time-of-flight sensor 11 includes a light source 111, an array 112 of a plurality of pixel circuits 1121, and a processing circuit 113. The light source 111 is configured to operably emit projection light pulses at the object 10 according to a projection signal.

As shown in FIG. 1A, the array 112 includes the plural pixel circuits 1121, wherein the plural pixel circuits 1121 are arranged in rows and columns. Each of the plural pixel circuits 1121 in the array 112 is configured to operably accumulate image charges in response to reflection light pulses which are light pulses of the projection light pulses reflected from the object 10, and store a first sum of a plurality of first portions chg1 of the image charges and a second sum of a plurality of second portions chg2 of the image charges according to the projection signal over a plurality of accumulation periods Tap.

The processing circuit 113 is coupled to the array 112 of the pixel circuits 1121, and includes a first readout circuit 1131 and a second readout circuit 1132. The first readout circuit 1131 is configured to operably calculate the first sum of the first portions chg1 of the image charges. The second readout circuit 1132 is configured to operably calculate the second sum of the second portions chg2 of the charges. The first readout circuit 1131 and the second readout circuit 1132 simultaneously calculate the first sum of the first portions chg1 of the image charges and the second sum of the second portions chg2 of the image charges to generate a distance information signal of the 3D image of the object 10.

Note that, the projection light pulses for example include light pulses of visible light or infrared (IR) light according to the present invention. The time-of-flight sensor according to the present invention may be formed by backside illumination (BSI) technique, which is well known to those skilled in this art and therefore the details of the process steps are not redundantly explained here. One advantageous feature of the present invention over the prior art is that, according to the present invention, because the first readout circuit 1131 and the second readout circuit 1132 simultaneously calculate the first sum of the first portions of the image charges and the second sum of the second portions of the image charges, the common mode noise in the time-of-flight sensor can be more precisely eliminated in comparison to the prior art, especially when the time-of-flight sensor is formed by the BSI technique.

FIG. 1B shows a time chart of the first embodiment according to the present invention. As shown in FIG. 1B, the projection light pulses for example are synchronized and in-phase with the projection signal. In each of the accumulation periods Tap, the first portion chg1 of the image charges are accumulated in the pixel circuit 1121 during a first time period T1, and the second portion chg2 of the image charges are accumulated in the pixel circuit 1121 during a second time period T2, wherein the first time period T1 and the second time period T2 are both in said each accumulation period Tap and the second time period T2 is directly following the first time period T1.

In the time-of-flight sensor of the present invention, the processing circuit calculates a distance between the object and the time-of-flight sensor to generate the distance information signal, based on a round trip time which is the time taken from when the projection light pulses start being emitted to when the reflection light pulses reach the array 112 of the pixel circuits 1121. And the time-of-flight sensor accumulates and stores the image charges over the plural accumulation periods to obtain higher signal levels of the first portions of the image charges and the second portions of the image charges.

For example, the light source 111 and the array 112 of the pixel circuits 1121 are located at a distance L from the object 10. Due to the amount of time that it takes for the projection light pulses to travel the distance L from the light source 111 to the object 10, and then the additional time it takes for the reflection light pulses to travel the distance L back from the object 10 to the array 112 of the pixel circuits 1121, there is a delay time Ttof between the projection light pulses and the reflection light pulses. The delay time Ttof represents the time of flight for the projection light pulses to make the round trip between the light source 111/array 112 and the object 10. Once the delay time Ttof is known, the distance L from the light source 111/array 112 to the object 10 can be determined by the Equation 1 below:

$$L = \frac{Ttof \times c}{2}$$

wherein c is the velocity of light.

Referring to FIG. 1B, for example, the projection light pulses are in-phase with the projection signal, but the reflection light pulses are phase-shifted by the delay time Ttof from the projection light pulses. The pixel circuit 1121 senses the reflection light pulses and accumulates the image charges in response to the reflection light pulses during ON time periods Ton as indicated by the shaded regions shown in FIG. 1B. As shown in FIG. 1B, in each accumulation period Tap, the accumulated image charges are stored and separated to two portions, i.e. the first portion chg1 and the second portion chag2, according to a first transfer control signal G_PGA and a second transfer control signal G_PGB respectively. The plural first portions chg1 of the image charges over the plural accumulation periods Tap are stored to be the first sum, and the plural second portions chg2 of the image charges over the plural accumulation periods Tap are stored to be the second sum.

In one preferable embodiment, the first transfer control signal G_PGA is in-phase with the projection signal, with the first time period T1 as its ON time period of a pulse; and the second transfer control signal G_PGB has a same signal waveform as the first transfer control signal G_PGA, but is delayed by the first time period TA, with the second time period T2 as its ON time period of a pulse.

As shown in FIG. 1B, the projection signal, the projection light pulses, the reflection light pulses, the first transfer control signal G_PGA, and the second transfer control signal G_PGB for example have the same frequency, with the same period (which is equal to accumulation period Tap) and the same ON time (which is equal to the ON time period Ton). In this embodiment, the first transfer control signal G_PGA is in-phase with the projection light pulse, and the second transfer control signal G_PGB is out-of-phase with the projection light pulse. Each pulse of the second transfer control signal G_PGB immediately follows and does not overlap with a previous pulse of the first transfer control signal G_PGA. Therefore, as shown in FIG. 1B, in each accumulation period Tap, the pixel circuit 1121 receives a first portion of the reflection light pulse during the first time period T1 of the first transfer control signal G_PGA and receives a second portion of the reflection light pulse during the second time period T2 of the second transfer control signal G_PGB.

As thus, in this embodiment, the delay time Ttof can be determined by the Equation 2 below:

$$Ttof = Ton\left(\frac{chg2}{chg1 + chg2}\right)$$

Once the delay time Ttof is determined, the distance L from the light source 111 to the object 10 can be determined by the aforementioned Equation 1.

Figure 2A:
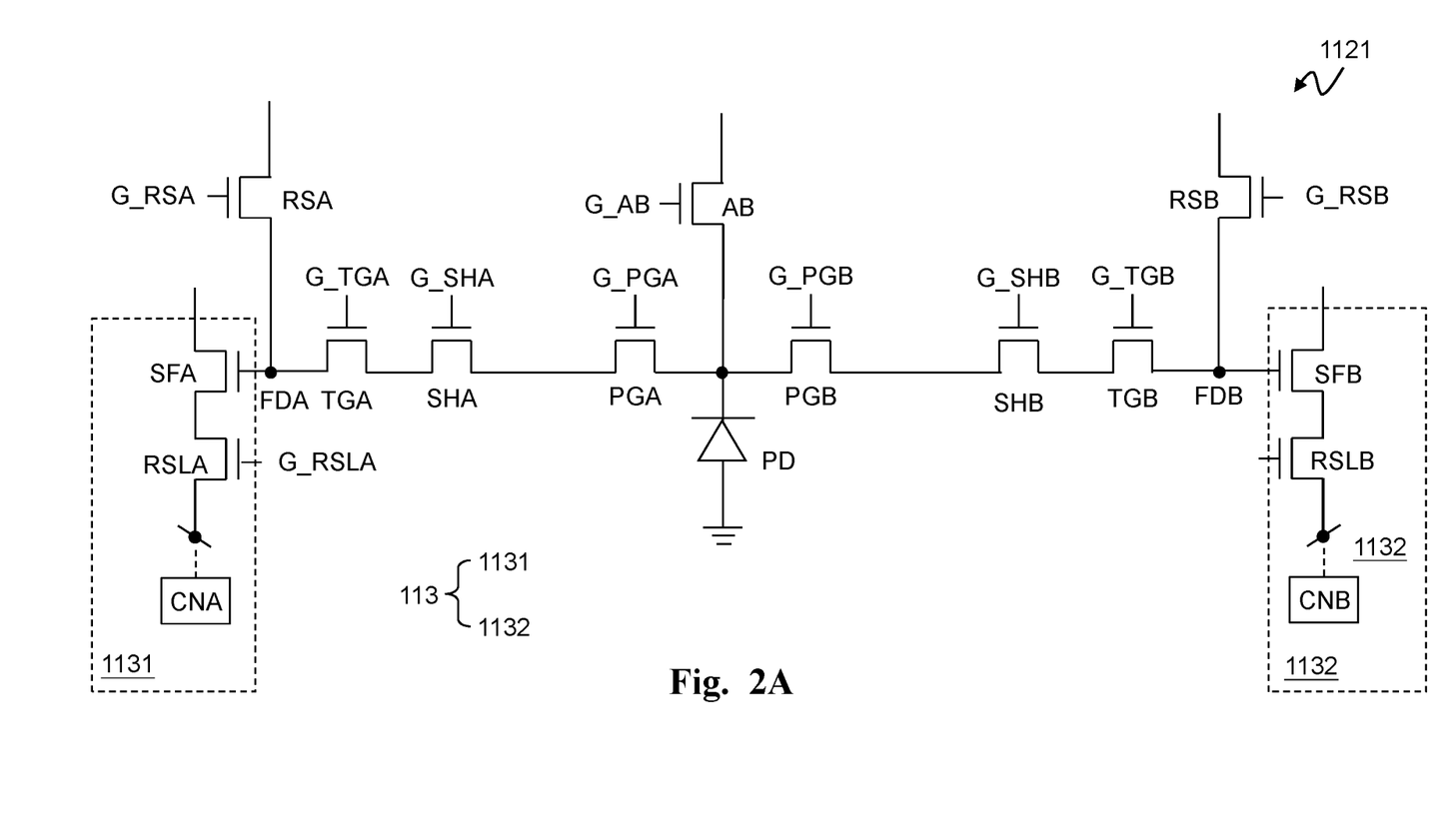
FIG. 2A is a schematic diagram of a second embodiment showing a pixel circuit according to the present invention.
Figure 2B:
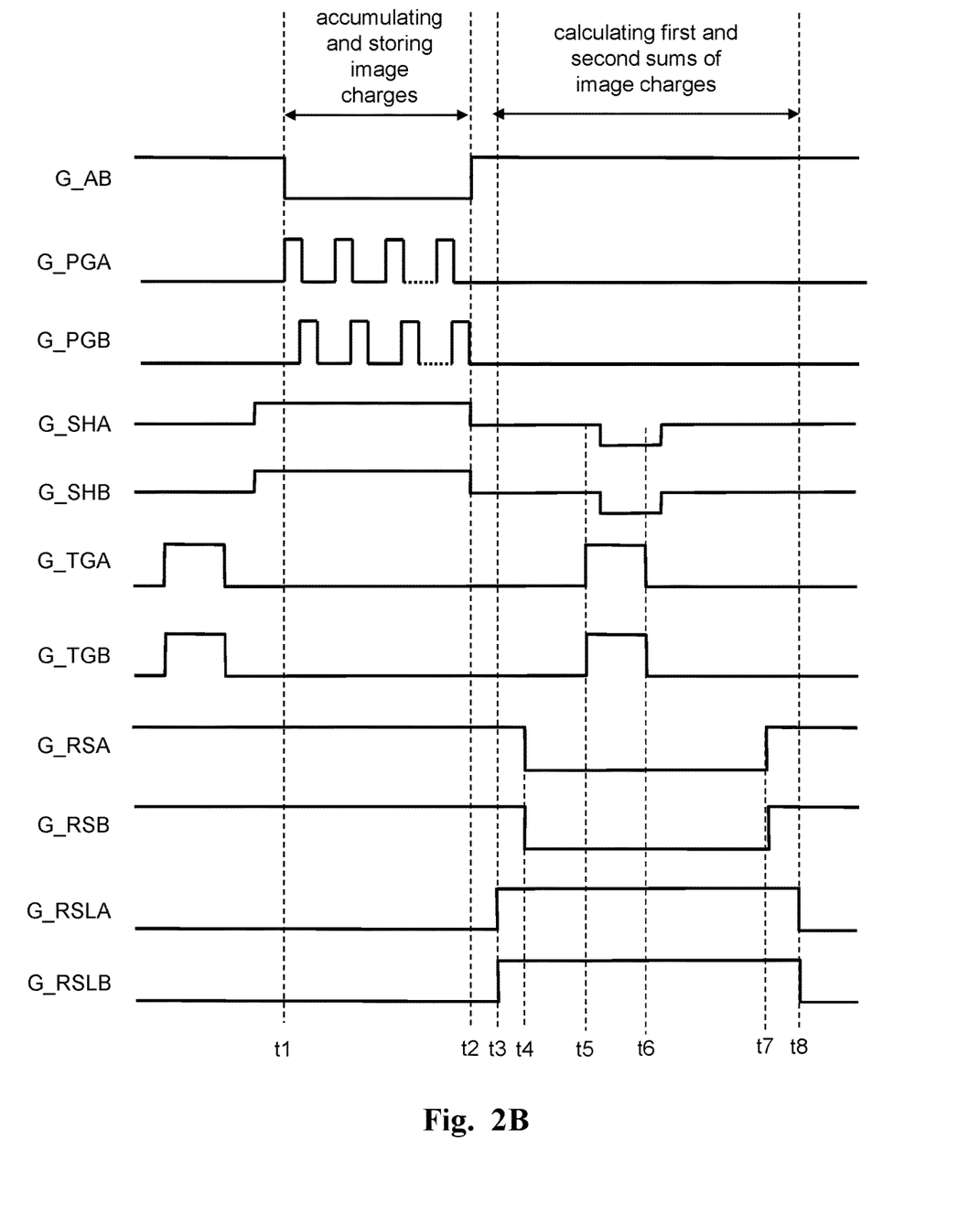
FIG. 2B is a schematic diagram showing signal waveforms of the second embodiment according to the present invention.

FIGS. 2A and 2B show schematic diagrams of a second embodiment according to the present invention. FIG. 2A is a schematic diagram of the second embodiment showing a more specific embodiment of the pixel circuit 1121 according to the present invention. FIG. 2B is a schematic diagram showing signal waveforms of the second embodiment according to the present invention.

As shown in FIG. 2A, the pixel circuit 1121 includes a photodiode PD, a first storage unit SHA, a first transfer transistor PGA, a first output transistor TGA, a second storage unit SHB, a second transfer transistor PGB, a second output transistor TGB, a first reset transistor RSA, a second reset transistor RSB, and a photodiode reset transistor AB.

Referring to FIG. 2A, the photodiode PD is configured to operably accumulate the image charges in the accumulation periods Tap in response to the reflection light pulse. The first storage unit SHA is configured to operably store the first sum of the first portions chg1 of the image charges, wherein the first sum of the first portions chg1 of the image charges is a sum of the first portions chg1 of the image charges over the accumulation periods Tap. The first transfer transistor PGA as a first transfer switch, is coupled between the photodiode PD and the first storage unit SHA, and is configured to operably transfer the first portions chg1 of the image charges from the photodiode PD to the first storage unit SHA over the accumulation periods according to the projection signal. The first output transistor TGA is coupled to the first storage unit SHA, and is configured to operably transfer the first sum of the first portions chg1 of the image charges from the first storage unit SHA to the first readout circuit 1131.

Still referring to FIG. 2A, the second storage unit SHB is configured to operably store the second sum of the second portions chg2 of the image charges, wherein the second sum of the second portions chg2 of the image charges is a sum of the second portions chg2 of the image charges over the accumulation periods Tap. The second transfer transistor PGB as a second transfer switch, is coupled between the photodiode PD and the second storage unit SHB, and is configured to operably transfer the second portions chg2 of the image charges from the photodiode PD to the second storage unit SHB over the accumulation periods Tap according to the projection signal. The second output transistor TGB is coupled to the second storage unit SHB, and is configured to operably transfer the second sum of the second portions chg2 of the image charges to the second readout circuit 1132.

Referring to FIG. 2A, in this embodiment, the processing circuit 113 includes the first readout circuit 1131 and the second readout circuit 1132. The first readout circuit 1131 includes for example but not limited to, a source follower SFA, a row selection transistor RSLA, and a counter CNA. The source follower SFA is coupled to a first readout node FDA and is configured to convert the first sum of the first portions of the image charges to a first readout signal. The row selection transistor RSLA is coupled to the source follower SFA. In one embodiment, the row selection transistor RSLA is controlled by a row selection signal G_RSLA, so as to enable the row selection transistor RSLA to transfer the first readout signal to the counter CNA. The counter CNA is coupled to the row selection transistor RSLA, and calculate the first readout signal. The counter CNA is for example but not limited to a counter for counting a voltage level of the first readout signal. The counter CNA can be embodied in various forms as well known to those skilled in this art, and the present invention is not limited to any specific form thereof.

The second readout circuit 1132 includes for example but not limited to, a source follower SFB, a row selection transistor RSLB, and a counter CNB. The source follower SFB is coupled to a second readout node FDB and is configured to convert the second sum of the second portions of the image charges to a second readout signal. The row selection transistor RSLB is coupled to the source follower SFB. In one embodiment, the row selection transistor RSLB is controlled by a row selection signal G_RSLB, so as to enable the row selection transistor RSLB to transfer the second readout signal to the counter CNB. The counter CNB is coupled to the row selection transistor RSLB, and calculate the second readout signal. The counter CNB is for example but not limited to a counter for counting a voltage level of the second readout signal. The counter CNB can be embodied in various forms as well known to those skilled in this art, and the present invention is not limited to any specific form thereof.

The first readout circuit 1131 and the second readout circuit 1132 simultaneously calculate the first sum of the first portions of the image charges and the second sum of the second portions of the image charges to generate the distance information signal of the 3D image of the object 10. In this embodiment, the counter CNA counts the voltage level of the first readout signal simultaneously as the counter CNB counts the voltage level of the second readout signal; that is, the counters CAN and CNB count simultaneously.

Still referring to FIG. 2A, the first reset transistor RSA is coupled to the first readout node FDA between the first output transistor TGA and the first readout circuit 1131, and is configured to operably reset charges accumulated at the first readout node FDA after the first sum of the first portions of the image charges is converted to the first readout signal. The second reset transistor RSB is coupled to the second readout node FDB between the second output transistor TGB and the second readout circuit 1132, and is configured to operably reset charges accumulated at the second readout node FDB after the second sum of the second portions of the image charges is converted to the second readout signal.

Still referring to FIG. 2A, the photodiode reset transistor AB is coupled to the photodiode PD, and is configured to operably reset charges accumulated in the photodiode PD after the plurality of accumulation periods Tap.

As shown in FIG. 2B, in time period from the time point t1 to the time point t2, the plural accumulation periods Tap take place for the time-of-flight sensor 11 to accumulate and store the image charges, and in the time period from the time point t3 to the time point t8, the time-of-flight sensor 11 calculates the first sum and the second sum of the image charges simultaneously.

Referring to FIG. 2B, at the time point t1, a photodiode reset signal G_AB changes from a photodiode reset state (level high) to a photodiode accumulating and storing state (level low); and at the time point t2, the photodiode reset signal G_AB changes from the photodiode accumulating and storing state (level low) to the photodiode reset state (level high). During the time period between the time points t1 and t2, the first transfer control signal G_PGA includes plural pulses, wherein each pulse has the first time period T1 as its ON time period; and the second transfer control signal G_PGB includes plural pulses, wherein each pulse has the second time period T2 as its ON time period; besides, each pulse of the second transfer control signal G_PGB is directly following a corresponding previous pulse of the first transfer control signal G_PGA.

Still referring to FIG. 2B, a first storage control signal G_SHA and a second storage control signal G_SHB control the first storage unit SHA and the second storage unit SHB respectively, and they both change to a storage enable state before the time point t1, to enable the first storage unit SHA and the second storage unit SHB to store the first portions chg1 of the image charges and the second portions chg2 of the image charges respectively. The first storage control signal G_SHA and the second storage control signal G_SHB both change to a storage disable state at the time point t2, to disable the first storage unit SHA and the second storage unit SHB from storing the first portions chg1 of the image charges and the second portions chg2 of the image charges respectively.

Still referring to FIG. 2B, the row selection signals G_RSLA and G_RSLB enable the row selection transistors RSLA and RSLB to transfer the first readout signal to the counter CNA and transfer the second readout signal to the counter CNB respectively at the time point t3. The row selection signals G_RSLA and G_RSLB terminate the row selection transistors RSLA and RSLB to stop transferring the first readout signal to the counter CNA and stop transferring the second readout signal to the counter CNB respectively at the time point t8.

Still referring to FIG. 2B, a first reset signal G_RSA and a second reset signal G_RSB change from a reset state to a transfer state at the time point t4 after the time point t3, to control the first reset transistor RSA and the second reset transistor RSB to stop resetting charges accumulated at the first readout node FDA and the second readout node FDB respectively; and the first reset signal G_RSA and the second reset signal G_RSB change from the transfer state to the reset state at the time point t7 before the time point t8, to control the first reset transistor RSA and the second to reset the charges accumulated at the first readout node FDA and the second readout node FDB respectively after the first sum is converted to the first readout signal and the second sum is converted to the second readout signal.

Still referring to FIG. 2B, output control signals G_TGA and G_TGB enable the first output transistor TGA and the second output transistor TGB to transfer the first sum of the first portions chg1 of the image charges from the first storage unit SHA to the first readout circuit 1131 and transfer the second sum of the second portions chg2 of the image charges from the second storage unit SHB to the second readout circuit 1132 respectively at the time point t5. The output control signals G_TGA and G_TGB terminate the first output transistor TGA and the second output transistor TGB to stop transferring the first sum of the first portions chg1 of the image charges from the first storage unit SHA to the first readout circuit 1131 and stop transferring the second sum of the second portions chg2 of the image charges from the second storage unit SHB to the second readout circuit 1132 respectively at the time point t6.

Still referring to FIG. 2B, the first storage control signal G_SHA changes from the storage disable state to a storage transfer state at a time point after the time point t5, so that the first output transistor TGA is able to transfer the first sum of the first portions chg1 of the image charges from the first storage unit SHA to the first readout circuit 1131, and the first storage control signal G_SHA changes from the storage transfer state to the storage disable state at a time point after the time point t6, to prepare the first storage unit SHA for storing the first portions chg1 of the image charges in the next accumulation period Tap.

Still referring to FIG. 2B, the second storage control signal G_SHB changes from the storage disable state to a storage transfer state at the time point after the time point t5, so that the second output transistor TGB is able to transfer the second sum of the second portions chg2 of the image charges from the second storage unit SHB to the second readout circuit 1132, and the second storage control signal G_SHB changes from the storage transfer state to the storage disable state at the time point after the time point t6, to prepare the second storage unit SHB for storing the second portions chg2 of the image charges in the next accumulation period Tap.

Figure 3:
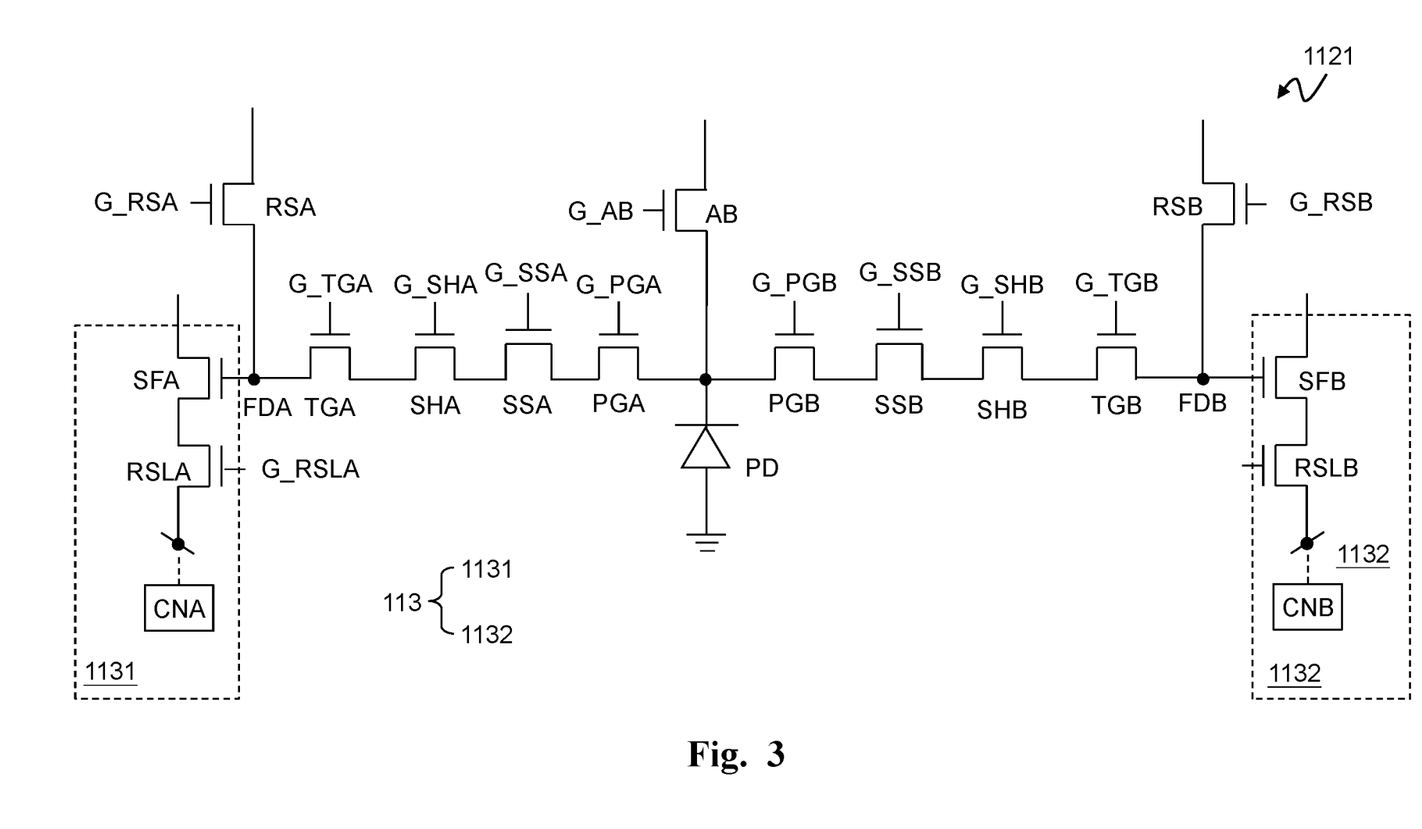
FIG. 3 shows a schematic diagram of a third embodiment according to the present invention.

FIG. 3 shows a schematic diagram of a third embodiment according to the present invention. This embodiment is different from the second embodiment in that, in this embodiment, the pixel circuit 1121 further includes one more first transfer transistor SSA and one more second transfer transistor SSB. The first transfer transistors PGA and SSA are connected in series to form the first transfer switch. The second transfer transistors PGB and SSB are connected in series to form the second transfer switch. The first transfer transistor SSA is controlled by a first transfer control signal G SSA which is related to the first transfer control signal G_PGA. For example, the first transfer control signal G SSA is simultaneous with the first transfer control signal G_PGA. The first transfer transistor SSA is configured to operably improve the parasitic light sensitivity (PLS). The second transfer transistor SSB is controlled by a second transfer control signal G SSB which is related to the second transfer control signal G_PGB. For example, the second transfer control signal G SSB is simultaneous with the second transfer control signal G_PGB. The second transfer transistor SSB is also configured to operably improve the parasitic light sensitivity (PLS).

In a preferable embodiment, the first storage unit SHA includes a first storage transistor as shown in FIG. 3, and the second storage unit SHB includes a second storage transistor as shown in FIG. 3. The first storage transistor or the second storage transistor may have its source and/or drain shared with a neighboring device, for example but not limited to the first/second transfer transistor, and/or the first/second output transistor.

Figure 4:
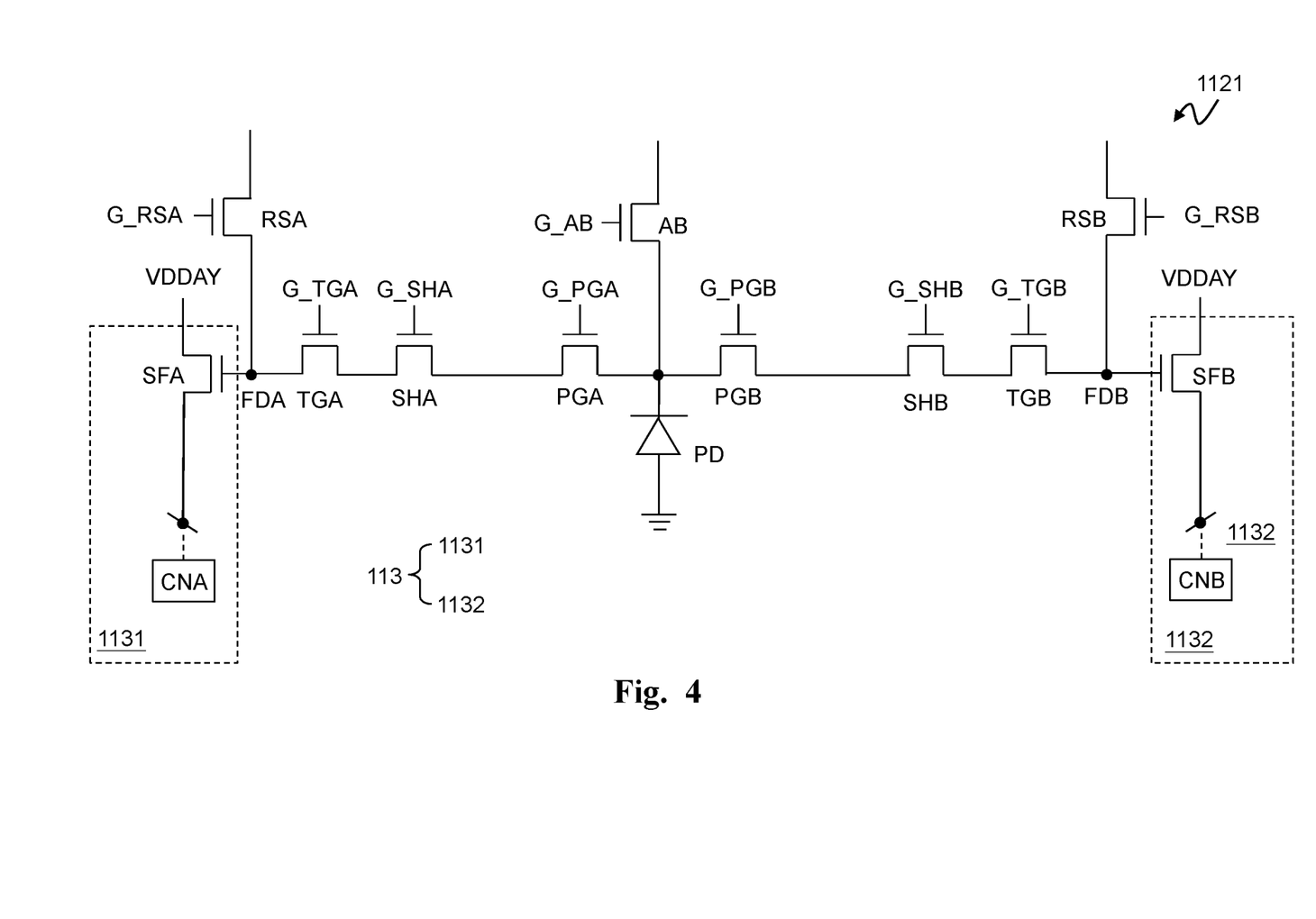
FIG. 4 shows a schematic diagram of a fourth embodiment according to the present invention.

FIG. 4 shows a schematic diagram of a fourth embodiment according to the present invention. This embodiment is different from the second embodiment in that, in this embodiment, the first readout circuit 1131 does not include the row selection transistor RSLA, and the second readout circuit 1132 does not include the row selection transistor RSLB. The row selection transistor RSLA and the row selection transistor RSLB can be omitted for example when an adjustable internal voltage VDDAY is provided, wherein the adjustable internal voltage VDDAY is adjusted to a voltage level lower than the threshold voltages of the source followers SFA and SFB when a row of the array 112 is not selected.

Figure 5:
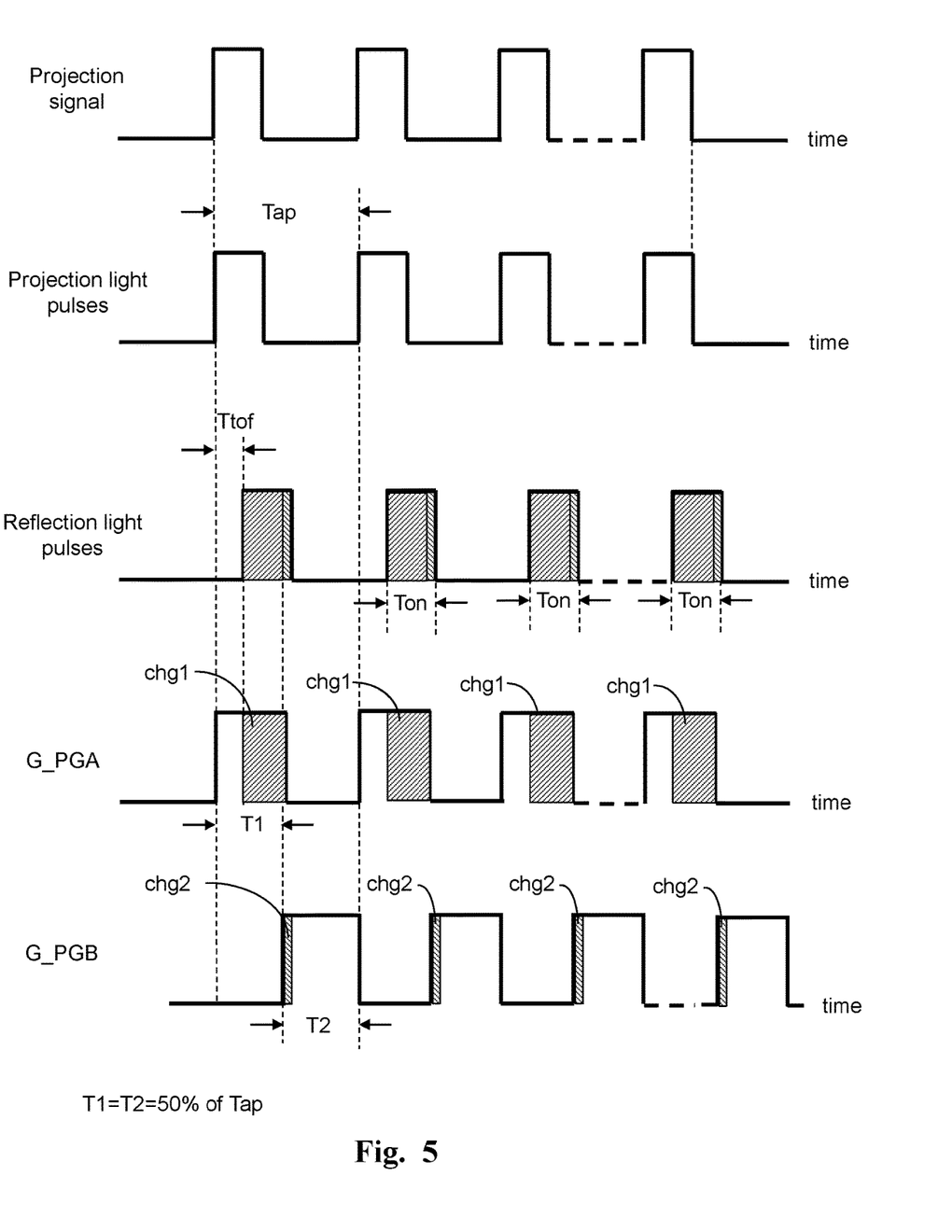
FIG. 5 shows a schematic diagram of a fifth embodiment according to the present invention.

FIG. 5 shows a schematic diagram of a fifth embodiment according to the present invention. This embodiment is different from the first embodiment in that, in this embodiment, the first time period T1 and the second time period T2 are both 50% of the accumulation period Tap, and the second time period T2 is directly following the first time period T1 as shown in the figure.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A time-of-flight sensor, configured to operably capture a three-dimensional (3D) image of an object, the time-of-flight sensor comprising:
   a light source, which is configured to operably emit projection light pulses at the object according to a projection signal;
   an array of a plurality of pixel circuits, wherein each of the pixel circuits is configured to operably accumulate image charges in response to reflection light pulses which are light pulses of the projection light pulses reflected from the object, and store a first sum of a plurality of first portions of the image charges and a second sum of a plurality of second portions of the image charges according to the projection signal over a plurality of accumulation periods; and a processing circuit, which is coupled to the array of the pixel circuits, and includes:
  a first readout circuit, which is configured to operably calculate the first sum of the first portions of the image charges; and
  a second readout circuit, which is configured to operably calculate the second sum of the second portions of the image charges;
wherein the first readout circuit and the second readout circuit simultaneously calculate the first sum of the first portions of the image charges and the second sum of the second portions of the image charges to generate a distance information signal of the 3D image of the object;
wherein in each of the accumulation periods, the first portion of the image charges are accumulated in the pixel circuit during a first time period, and the second portion of the image charges are accumulated in the pixel circuit during a second time period, wherein the first time period and the second time period are both within said each accumulation period and the second time period is directly following the first time period;
wherein a delay time between the projection light pulses and the reflection light pulses is proportional to a product of an ON time period and a division of the second sum of a sum of the first sum and the second sum.

2. The time-of-flight sensor of claim 1, wherein the pixel circuit includes:
  a photodiode, which is configured to operably accumulate the image charges in the accumulation periods in response to the reflection light pulse;
  a first storage unit, which is configured to operably store the first sum of the first portions of the image charges, wherein the first sum of the first portions of the image charges is a sum of the first portions of the image charges over the accumulation periods;
  a first transfer switch, which is coupled between the photodiode and the first storage unit, and is configured to operably transfer the first portions of the image charges from the photodiode to the first storage unit over the accumulation periods according to the projection signal;
  a first output transistor, which is coupled to the first storage unit, and is configured to operably transfer the first sum of the first portions of the image charges from the first storage unit to the first readout circuit;
  a second storage unit, which is configured to operably store the second sum of the second portions of the image charges, wherein the second sum of the second portions of the image charges is a sum of the second portions of the image charges over the accumulation periods;
  a second transfer switch, which is coupled between the photodiode and the second storage unit, and is configured to operably transfer the second portions of the image charges from the photodiode to the second storage unit over the accumulation periods according to the projection signal; and
  a second output transistor, which is coupled to the second storage unit, and is configured to operably transfer the second sum of the second portions of the image charges to the second readout circuit.

3. The time-of-flight sensor of claim 2, wherein the pixel circuit further includes:
  a first reset transistor, which is coupled to a first readout node between the first output transistor and the first readout circuit, and is configured to operably reset charges accumulated at the first readout node; and
  a second reset transistor, which is coupled to a second readout node between the second output transistor and the second readout circuit, and is configured to operably reset charges accumulated at the second readout node.

4. The time-of-flight sensor of claim 3, the first readout circuit includes:
  a first source follower, which is coupled to the first readout node, and is configured to convert the first sum of the first portions of the image charges to a first readout signal;
  a first row selection transistor, which is coupled to the first source follower, and is configured to operably transfer the first readout signal to a first counter; and
  the first counter, which is coupled to the first row selection transistor, and is configured to operably calculate the first readout signal; and
the second readout circuit includes:
  a second source follower, which is coupled to the second readout node, and is configured to convert the second sum of the second portions of the image charges to a second readout signal;
  a second row selection transistor, which is coupled to the second source follower, and is configured to operably transfer the second readout signal to a second counter; and
  the second counter, which is coupled to the second row selection transistor, and is configured to operably calculate the second readout signal.

5. The time-of-flight sensor of claim 3, wherein the first reset transistor receives a first two-state signal which has a first reset state and a first disable state, for resetting charges accumulated at the first readout node and disable the first readout circuit respectively; and
  wherein the second reset transistor receives a second two-state signal which has a second reset state and a second disable state, for resetting charges accumulated at the second readout node and disable the second readout circuit respectively.

6. The time-of-flight sensor of claim 2, wherein the first transfer switch includes two first transfer transistors connected in series; and wherein the second transfer switch includes two second transfer transistors connected in series.

7. The time-of-flight sensor of claim 2, wherein the first storage unit includes a first storage transistor; and wherein the second storage unit includes a second storage transistor.

8. The time-of-flight sensor of claim 2, wherein the pixel circuit further includes a photodiode reset transistor, which is coupled to the photodiode, and is configured to operably reset charges accumulated in the photodiode after the plurality of accumulation periods.

9. The time-of-flight sensor of claim 2, wherein a first transfer control signal which controls the first transfer switch is in-phase with the projection signal.

10. The time-of-flight sensor of claim 1, wherein the first time period and the second time period are both 50% of said each accumulation period and the second time period is directly following the first time period.

11. A control method of a time-of-flight sensor for capturing a three-dimensional (3D) image of an object, the control method comprising:
   emitting projection light pulses at the object according to a projection signal;
   accumulating image charges in response to reflection light pulses which are light pulses of the projection light pulses reflected from the object;
   storing a first sum of a plurality of first portions of the image charges and a second sum of a plurality of second portions of the image charges according to projection signal over a plurality of accumulation periods;
   calculating the first sum of the first portions of the image charges and the second sum of the second portions of the image charges simultaneously; and
   generating a distance information signal of the 3D image of the object according to the first sum of the first portions of the image charges and the second sum of the second portions of the image charges;
   wherein in each of the accumulation periods, the first portion of the image charges are accumulated during a first time period, and the second portion of the image charges are accumulated during a second time period, wherein the first time period and the second time period are both within said each accumulation period and the second time period is directly following the first time period;
   wherein a delay time between the projection light pulses and the reflection light pulses is proportional to a product of an ON time period and by a division of the second sum of a sum of the first sum and the second sum.

12. The control method of claim 11, further comprising:
   transferring the first portions of the image charges from a photodiode to a first storage unit over the accumulation periods according to the projection signal;
   transferring the first sum of the first portions of the image charges from the first storage unit to a first readout circuit which is configured to operably calculate the first sum of the first portions of the image charges;
   transferring the second portions of the image charges from the photodiode to a second storage unit over the accumulation periods according to the projection signal; and
   transferring the second sum of the second portions of the image charges from the second storage unit to a second readout circuit which is configured to operably calculate the second sum of the second portions of the image charges.

13. The control method of claim 12, further comprising: resetting charges accumulated at a first readout node and a second readout node, wherein the first readout node is between the first storage unit and the first readout circuit, and the second readout node is between the second storage unit and the second readout circuit.

14. The control method of claim 12, wherein the first time period and the second time period are both 50% of said each accumulation period and the second time period is directly following the first time period.

15. The control method of claim 12, further comprising: resetting charges accumulated in the photodiode after the plurality of accumulation periods.

* * * * *